T. D. ROBINSON.
VEHICLE SPRING.
APPLICATION FILED JUNE 9, 1919.
1,334,403.
Patented Mar. 23, 1920.
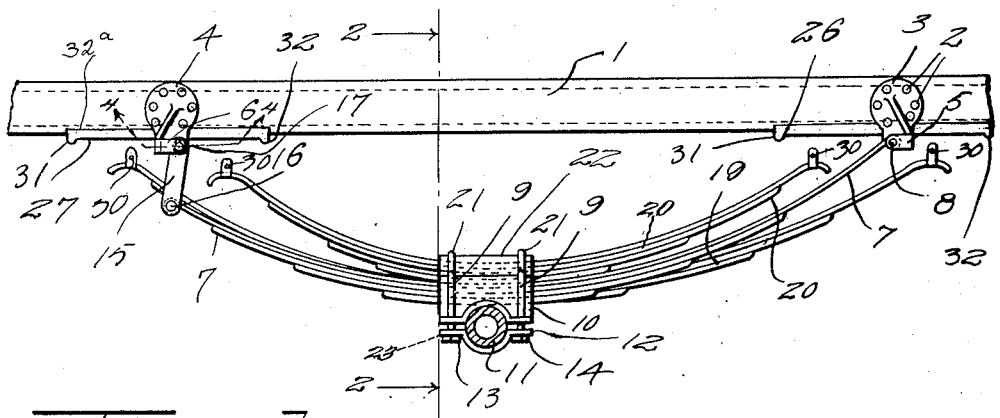
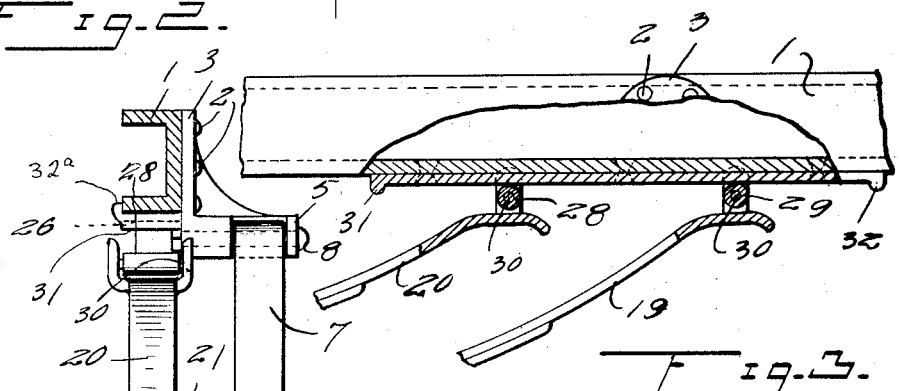
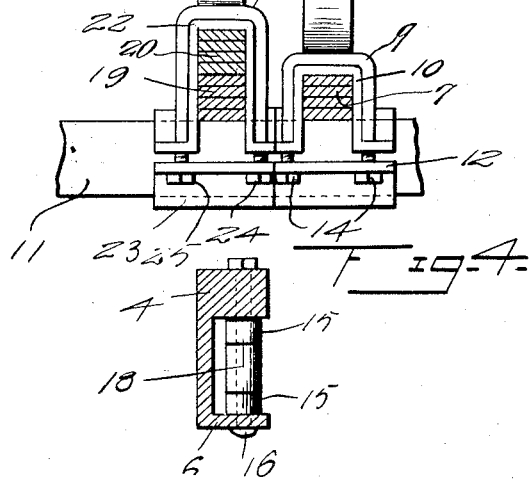
Inventor
T. D. Robinson
By Watson E. Coleman
Attorney

UNITED STATES PATENT OFFICE.

TIVES D. ROBINSON, OF PATTON, MISSOURI.

VEHICLE-SPRING.

1,334,403.  Specification of Letters Patent.  Patented Mar. 23, 1920.

Application filed June 9, 1919. Serial No. 302,928.

*To all whom it may concern:*

Be it known that I, TIVES D. ROBINSON, a citizen of the United States, residing at Patton, in the county of Bollinger and State of Missouri, have invented certain new and useful Improvements in Vehicle-Springs, of which the following is a specification, reference being had to the accompanying drawings.

This invention relates to an improved vehicle spring, and the invention aims to provide a very simple, efficient and practical device of this kind, which may be manufactured for a relatively low cost, and sold at a reasonable profit.

The invention further aims to provide a vehicle spring adapted to resiliently withstand variable loads, for instance a light load, a heavy load, or an intermediate load.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in side elevation of a portion of a frame or chassis, and a part of an axle, showing the improved vehicle spring as applied thereto and constructed in accordance with the invention.

Fig. 2 is a sectional view on line 2—2 of Fig. 1, more clearly showing the location of the springs.

Fig. 3 is an enlarged detail sectional view of a portion of a pair of springs, for withstanding intermediate and heavy loads, showing the rollers on the ends of the springs in contact with wear plates on the lower edge of the sill of the chassis or frame.

Fig. 4 is a sectional view on line 4—4 of Fig. 1.

Referring more especially to the drawings, 1 designates the side sill of a vehicle chassis or frame, and secured by bolts or the like 2 to the sill are hanger plates 3 and 4. These hanger plates are provided with spaced ears 5 and 6. The hanger plates 3 and 4 are secured to the side of the sill, so that the ears 5 and 6 are arranged offset to one side of the sill.

One end of a bowed vehicle spring 7 is mounted pivotally upon a pin 8, which is journaled in ears 5 of the hanger plate 3. It is to be noted that this vehicle spring 7 is constructed in the usual manner, therefore it comprises the several leaf springs as shown. The central or body portion of the vehicle spring 7 is permanently fastened by the staples or yokes 9 and the arched plate 10 to the supporting axle 11. The yokes or staples 9 straddle the plate 10 and their lower end portions pass through the arched plate 12, there being nuts 13 and 14 on the arms of the yokes or staples, to clamp the plates together as shown. Links 15 are pivotally connected by means of the pin 16 to the other end of the bowed vehicle spring 7. The links 15 are in turn pivotally mounted upon the pin 17, which is journaled in the ears 6 of the hanger plate 4, there being a sleeve 18 between the ends of the links, to hold them properly spaced. It is to be noted that by disposing the hanger plates on the side of the sill 1, the vehicle spring 7 is disposed in a position offset below the side of the sill.

A pair of superimposed bowed vehicle springs 19 and 20 are mounted upon the axle, and this is accomplished by means of the yokes or staples 21, which straddle the arched plate 22, the arms of the yokes or staples pass through the lateral flanges of the arched plate 22, and through the plate 23. This plate 23 is also arched and engages under the axle 11. On the arms of the yokes or staples and in engagement with the lateral flanges of the arched plate 22 are nuts 24 and 25, and by these nuts and the yokes or staples 21 the plates 22 and 23 are drawn tightly together, thereby securely mounting the bowed vehicle springs 19 and 20. These springs are of the usual construction, and therefore comprise the various usual leaf springs of different lengths as shown.

Wear plates 26 and 27 are secured to the under face of the sill 1 in positions adjacent the hanger plates. These wear plates have upwardly extending flanges engaging the opposite sides of the sill. The end portions of the bowed vehicle springs 19 and 20 are provided with rollers 28 and 29, journaled upon the pins 30. These rollers 28 and 29 are flanged at their ends, so that the flanges will engage portions of the opposite edges of the wear plates, that is when the rollers frictionally contact with the wear plates. The remote ends of the wear plates are provided with abutment shoulders 31 and 32, so as to be engaged by the rollers 29 of the ends of the bowed vehicle spring 19, so as to limit the bowed spring 19 in its resilient spreading actions, incident to the intermediate load on the frame, and this limiting of the resilient action coöperates with the resiliency and the pressure of the excessive heavy load on the frame relatively to the spring 20, in order to resist the excessive pressure of the heavy load. It is to be observed that the bowed vehicle spring 7 resists and accommodates the initial or light load, while the spring 19 accommodates the intermediate load, and the spring 20 together with the limiting action of the rollers 29 with the shoulders 31 and 32 accommodate the extreme heavy load. It is obvious that the bowed spring 7 may be dispensed with, if so desired, so that the bowed springs 19 and 20 may withstand the various loads which may be carried on the vehicle.

The invention having been set forth, what is claimed as new and useful is:

1. In a vehicle spring, the combination with a frame sill, of an axle, a bowed vehicle spring pivotally mounted upon the sill in an offset position thereto and below the same and having an elongated connection with the sill at one end, connections between the bowed spring and the axle, a pair of super-imposed bowed vehicle springs connected to the axle having rollers journaled in their opposite ends, and wear plates on the under face of the sill to be engaged by said rollers.

2. In a vehicle spring, the combination with a frame sill, of an axle, a bowed vehicle spring pivotally mounted upon the sill in an offset position thereto and below the same and having an elongated connection with the sill at one end, connections between the bowed spring and the axle, a pair of superimposed bowed vehicle springs connected to the axle having rollers journaled in their opposite ends, and wear plates on the under face of the sill to be engaged by said rollers, said wear plates having abutment shoulders at their remote ends to be engaged by the rollers of the lower bowed spring.

3. The combination with a frame sill, of a supporting axle, a dominant bowed spring mounted on the axle and having one end pivotally connected to the side of the sill, the other end having elongated connections to the side of the sill, a pair of super-imposed bowed springs mounted on the axle to resist the various loads which may be supported upon the frame, the opposite ends of the pair of bowed springs having flanged rollers, U-shaped wear plates secured to the end edge of the sill, and having their remote ends provided with abutment shoulders to be engaged by the bowed spring for withstanding the intermediate load.

4. The combination with a frame sill having wear plates fixed to its end edge and spaced apart for a substantial distance, said wear plates having their remote ends provided with abutment shoulders, of a supporting axle, super-imposed bowed vehicle springs fixed to the axle, said springs having rollers journaled in their ends coöperating with the wear plates adapted to withstand various loads which may be supported upon the frame, the rollers of one of said springs adapted to coöperate with the abutment shoulders, to insure withstanding a greater load, which may be supported upon the frame 7.

In testimony whereof I hereunto affix my signature in the presence of two witnesses.

TIVES D. ROBINSON.

Witnesses:
 HARRY C. KUHLMAN,
 CHARLES H. KUHLMAN.